P. CARROLL, Jr.
AUTOMATIC LAND MARKER.
APPLICATION FILED MAR. 6, 1911.

997,114.

Patented July 4, 1911.

2 SHEETS—SHEET 1.

Witnesses

Inventor
P. Carroll, Jr.

By

Attorney

COLUMBIA PLANOGRAPH CO., WASHINGTON, D. C.

P. CARROLL, Jr.
AUTOMATIC LAND MARKER.
APPLICATION FILED MAR. 6, 1911.
997,114.
Patented July 4, 1911.
2 SHEETS—SHEET 2.
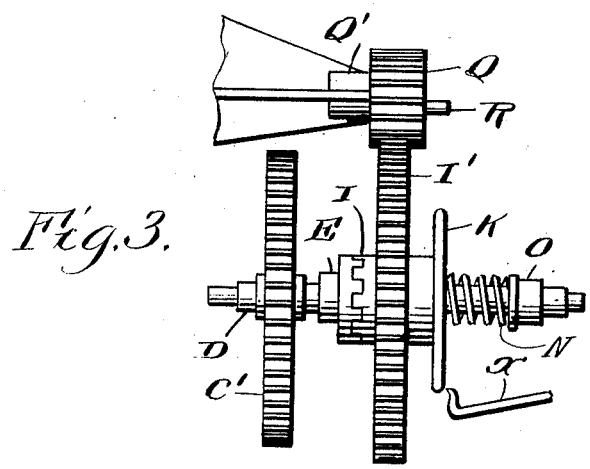
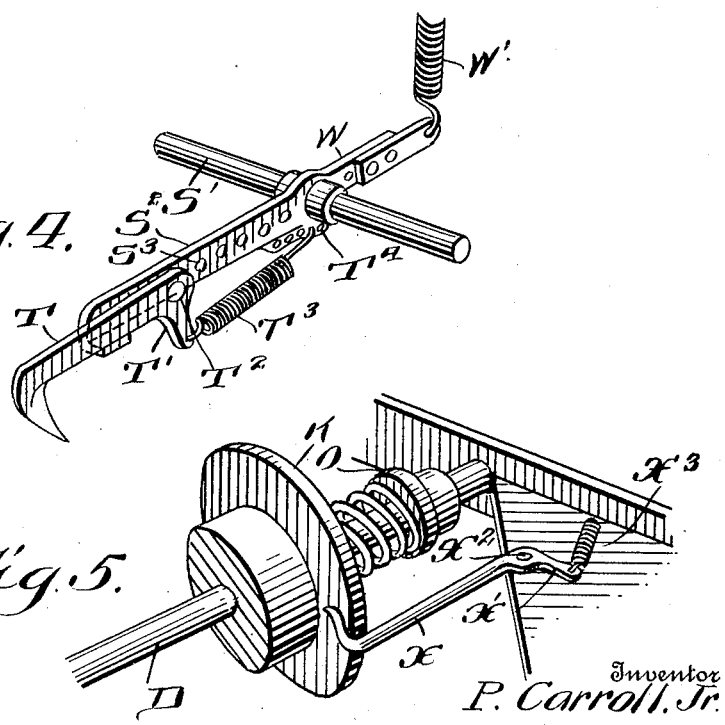
Inventor
P. Carroll, Jr.

UNITED STATES PATENT OFFICE.

PATRICK CARROLL, JR., OF BUNKER HILL, ILLINOIS.

AUTOMATIC LAND-MARKER.

997,114.   Specification of Letters Patent.   Patented July 4, 1911.

Application filed March 6, 1911.   Serial No. 612,626.

*To all whom it may concern:*

Be it known that I, PATRICK CARROLL, Jr., a citizen of the United States, residing at Bunker Hill, in the county of Macoupin and State of Illinois, have invented certain new and useful Improvements in Automatic Land-Markers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automatic land markers and the object in view is to produce a simple and efficient device of this nature having various details of construction and combinations and arrangements of parts which will be hereinafter fully described and then specifically defined in the appended claim.

I illustrate my invention in the accompanying drawings, in which:—

Figure 1:
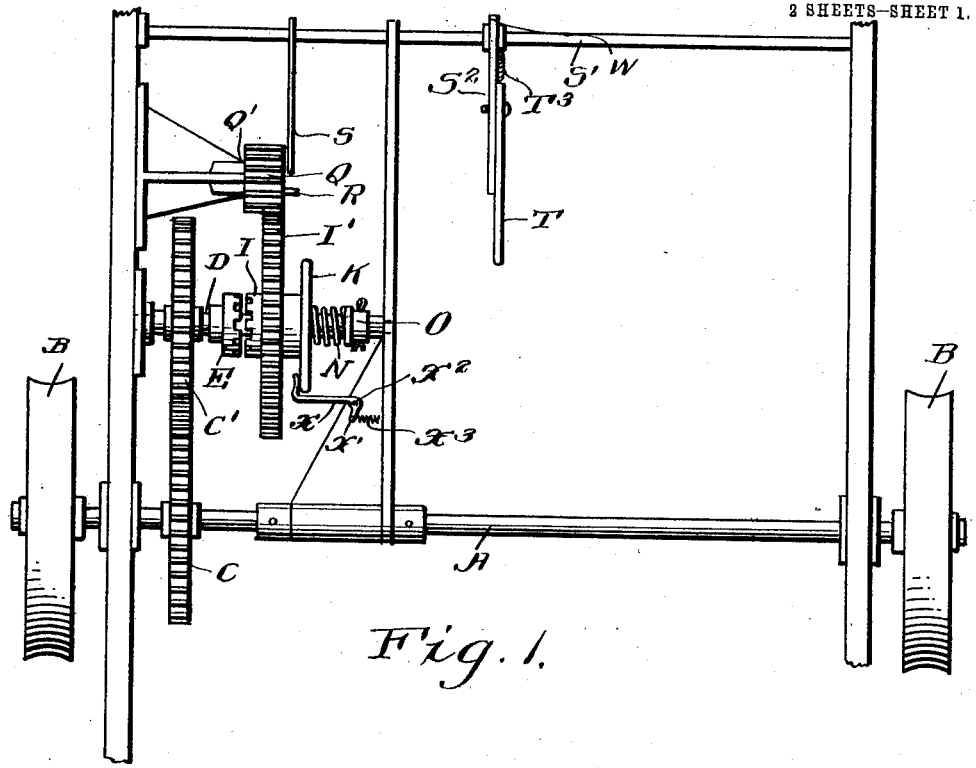
Figure 2:
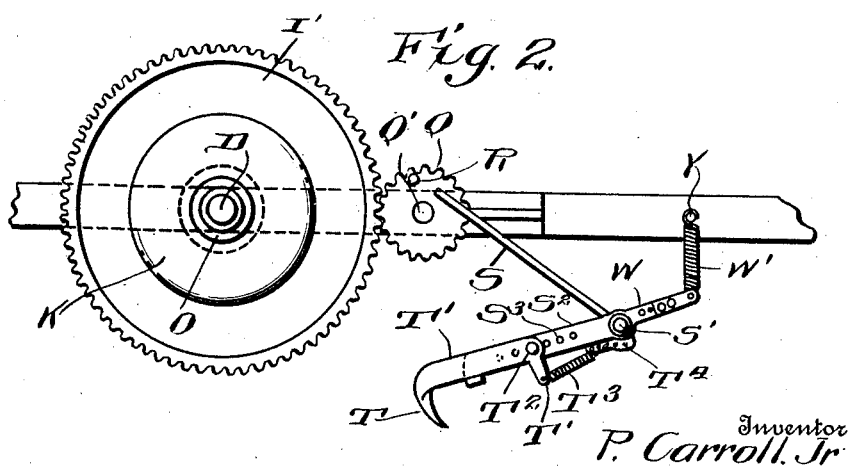

Figure 1 is a top plan view showing the application of my invention to the frame of a planter. Fig. 2 is an enlarged detail in elevation showing the adjustable gear connections and share attachment. Fig. 3 is an enlarged detail view showing the adjustment of the gear mechanism. Fig. 4 is an enlarged detail view of the share and attachment for tilting the same, and Fig. 5 is a detail view of a part of the invention.

Reference now being had to the details of the drawings by letter, A designates the planter axle or shaft upon which wheels B, having grooved circumferences are mounted. A gear wheel C is fixed to the shaft A and is in mesh with a similar gear wheel C', preferably of the same diameter as the wheels B, and which latter is fixed to a counter shaft D. A clutch collar E is fastened to said shaft D and the teeth upon the face thereof are adapted to mesh with the teeth of the sliding hub I which is loosely mounted upon the shaft and about which is a gear wheel I'. Integral with or secured to the gear wheel I' is a hand wheel K and a coiled spring N bears intermediate said wheel K and a collar O which is keyed to the shaft D, the office of said spring being to normally hold the teeth upon said clutch collar and the hub of the gear wheel I' in mesh.

A gear wheel Q, shown clearly in the detailed view in elevation, is mounted upon a shaft Q' and is adapted to mesh with the teeth of the gear wheel I'. It will be noted in the top plan view that the width of the gear wheel Q is greater than that of the wheel I', so that the latter may be moved back and forth upon its shaft for the purpose of throwing the hub thereof into or out of mesh with the clutch collar E and still be in mesh with the gear wheel Q. Projecting from one face of the gear wheel Q is a lug R, and S is a rod which is mounted upon a rock shaft S', and one end is positioned in the path of the lug R and is adapted each time the rod S tilts to rock the shaft S'. Also fixed to the rock shaft S' is an arm $S^2$ having a series of perforations $S^3$ therein. T designates a share having a pivoted end with an integral arm T', apertured at $T^2$ for the reception of a pin to be passed therethrough and also through one of the perforations $S^3$ to adjust the share relative to the arm upon which it is mounted. A coiled spring $T^3$ is fastened to the lug T' and its other end is adapted to be fastened in one or another of the eyes $T^4$ upon the arm $S^2$. An arm W is fixed to the shaft S' and a spring W' connects said arm W with the pin Y, the office of said spring being to return the parts to their normal positions after the shaft has been rocked. Said arm W is made preferably adjustable by being made up of sections, each with perforations therein which may be brought into registration to receive an adjusting pin.

A hook X is pivotally mounted upon the frame and is designed to engage over the edge of the hand wheel K to hold the same against the tension of the spring N so that the teeth upon the hub of the wheel I' will be out of mesh with the teeth of the clutch collar. One end X' of said hook projects beyond its pivot $X^2$ and a spring $X^3$ is fastened at one end to said projecting part and serves to normally release the hub when a wheel is moved to disengage the same.

The operation of the apparatus will be readily understood and is as follows:—The parts being adjusted to mark at proper intervals, each time the lug upon the gear wheel Q comes in contact with the end of the rod S, the rock shaft S' may be caused to tilt and the marking share thrown against the ground to mark the place for the reception of the seed to be planted. After the lug passes by the free end of the arm S, the spring connected to the rock shaft will cause the same to tilt to its normal position.

By the manipulation of the hand wheel K by the operator, the apparatus may be easily thrown into or out of gear. When it is desired to hold the land marking device from operation, the hook X may be caught over the edge of the wheel K to hold the same against the tension of the spring N.

What I claim to be new is:—

An automatic land marker comprising a frame, a driving shaft, wheels fixed thereto, a gear wheel fixed to said shaft, a counter shaft and pinion fixed thereto in mesh with said gear wheel, a clutch collar rotatable with the counter shaft, a spring-pressed gear wheel splined to the counter shaft and having a hub portion which is flanged, a spring-pressed pivotal hook engaging said flange, a rock shaft upon the frame of the apparatus, a rod fixed to said rock shaft, a rotatable pinion wheel in mesh with the gear wheel which is splined to the counter shaft and having a projection in the path of said tilting rod, an arm fixed to the rock shaft and provided with a series of perforations, an angled hooked share pivotally connected to said arm, a spring connecting an angled end of said arm with the rock shaft, and adjustable spring-actuated link connection intermediate said arm and the frame.

In testimony whereof I hereunto affix my signature in the presence of two witnesses.

PATRICK CARROLL, Jr.

Witnesses:
WILLIAM FAHRENKROG,
WILLIAM CARROLL.